US012363482B2

(12) United States Patent
Song et al.

(10) Patent No.: US 12,363,482 B2
(45) Date of Patent: Jul. 15, 2025

(54) SOUNDING DEVICE

(71) Applicants: AAC ACOUSTIC TECHNOLOGIES (SHENZHEN) CO., LTD., Shenzhen (CN); AAC Microtech (Changzhou) Co., Ltd., Changzhou (CN)

(72) Inventors: Wei Song, Shenzhen (CN); Xin Jin, Shenzhen (CN); Fan Zhang, Shenzhen (CN); Ronglin Linghu, Shenzhen (CN); Bo Xiao, Shenzhen (CN)

(73) Assignees: AAC ACOUSTIC TECHNOLOGIES (SHENZHEN) CO., LTD., Shenzhen (CN); AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/921,644

(22) PCT Filed: May 5, 2022

(86) PCT No.: PCT/CN2022/090945
§ 371 (c)(1),
(2) Date: Oct. 27, 2022

(87) PCT Pub. No.: WO2023/193321
PCT Pub. Date: Oct. 12, 2023

(65) Prior Publication Data

US 2025/0056163 A1 Feb. 13, 2025

(30) Foreign Application Priority Data

Apr. 7, 2022 (CN) ........................ 202220795541.8

(51) Int. Cl.
*H04R 9/06* (2006.01)
*H04R 1/02* (2006.01)
(Continued)

(52) U.S. Cl.
CPC ............... *H04R 9/06* (2013.01); *H04R 1/025* (2013.01); *H04R 7/04* (2013.01); *H04R 7/18* (2013.01);
(Continued)

(58) Field of Classification Search
CPC ...... H04R 9/06; H04R 2499/11; H04R 31/00; H04R 2460/13; H04R 9/025; H04R 9/046;
(Continued)

(56) References Cited

U.S. PATENT DOCUMENTS 10,524,032 B1 * 12/2019 Gu ......................... H04R 9/025
2015/0189442 A1 * 7/2015 Zhang .................... H04R 9/025
381/409

(Continued)

*Primary Examiner* — Carolyn R Edwards
*Assistant Examiner* — Julie X Dang
(74) *Attorney, Agent, or Firm* — Wiersch Law Group

(57) ABSTRACT

The present invention provides a sounding device including a housing body having a containment cavity and a sounding unit placed in the containment cavity. The sounding unit includes a vibration system and a magnetic circuit system. The sounding device includes a box, a coil, a circuit board, and an elastic assembly. The elastic assembly is used to suspend the box in the containment cavity. The present invention coil shares a magnetic circuit system with the vibration system and the sounding unit is directly used as the weight unit of the coil. The parts are shared to the greatest extent, the assembly process is simplified, and the cost is reduced.

9 Claims, 5 Drawing Sheets

A—A

(51) Int. Cl.
*H04R 7/04* (2006.01)
*H04R 7/18* (2006.01)
*H04R 9/02* (2006.01)
*H04R 9/04* (2006.01)

(52) U.S. Cl.
CPC ............. *H04R 9/025* (2013.01); *H04R 9/045* (2013.01); *H04R 2400/11* (2013.01)

(58) Field of Classification Search
CPC .... H04R 9/02; H04R 9/043; H04R 2209/024; H04R 1/02; H04R 7/02; H04R 1/06; H04R 7/18; H04R 2400/11; H04M 1/03; H04M 1/72478
USPC ....... 381/400, 401, 402, 403, 404, 405, 406, 381/407, 409, 410, 412
See application file for complete search history.

(56) References Cited

U.S. PATENT DOCUMENTS

| | | | | |
|---|---|---|---|---|
| 2015/0201256 | A1* | 7/2015 | Xu | H04R 1/06 381/417 |
| 2016/0021441 | A1* | 1/2016 | Shao | H04R 1/24 381/412 |
| 2018/0302722 | A1* | 10/2018 | Linghu | H04R 9/025 |
| 2020/0045432 | A1* | 2/2020 | Hu | H04R 7/20 |
| 2020/0059729 | A1* | 2/2020 | Gu | H04R 9/06 |
| 2020/0213752 | A1* | 7/2020 | Xiao | H04R 7/12 |
| 2023/0269539 | A1* | 8/2023 | Zhang | H04R 9/063 381/400 |

* cited by examiner

SOUNDING DEVICE

FIELD OF THE PRESENT DISCLOSURE

The present invention relates to the field of electro-acoustic transducers, in particular to a sounding device used in a portable electronic product.

DESCRIPTION OF RELATED ART

In the process of rapid development of mobile devices (such as mobile phones, tablet computers or laptop computers), people have higher and higher functional requirements of products. In order to make the entertainment effect more prominent, speakers are increasingly using the structure of speakers combined with boxes to form a speaker box to obtain a better low-frequency experience.

However, the silent notification of incoming calls of mobile communication terminal devices such as mobile phones needs to rely on the vibration of the body to remind the user. The vibration-generating component is the built-in vibration motor.

However, in the related art, the speaker and the motor are independently separated, a lot of space is occupied and many assembly processes are needed, and the cost is relatively high.

SUMMARY OF THE PRESENT INVENTION

The present invention is to provide a sounding device which reduces the manufacturing cost and has a low profile.

For achieving the object mentioned above, the present invention provides a sounding device, including:

- a housing body with a containment cavity;
- a sounding unit placed in the containment cavity, including a vibration system located in the containment cavity, a magnetic circuit system for driving the vibration system to vibrate along a first direction;
- a box located in the containment cavity for accommodating the magnetic circuit system and the vibration system;
- a coil arranged on a side of the magnetic circuit system away from the vibration system and keeping a distance from the magnetic circuit system;
- a circuit board locating on a side of the housing body facing the coil and electrically connected to the coil; and
- an elastic assembly with one end connected to the housing body and the other end connected to the box for elastically suspending the box in the containment cavity. The magnetic circuit system includes a main magnet and an auxiliary magnet around the main magnet for forming a magnetic gap. The coil is fixed to the housing body for driving the sounding unit to vibrate in a second direction perpendicular to the first direction.

Further, the box includes a frame connected to the vibration system, an upper box connected to the frame, and a lower box connected to a side of the upper box away from the frame; one end of the elastic assembly is connected to the housing body, and the other end of the elastic assembly is connected to the lower box; the coil is located on a side of the lower box away from the upper box.

Further, a side of the lower box away from the upper box is recessed toward the upper box for forming a mounting groove for at least partially receiving the coil.

The sounding device further includes a sealing membrane assembly disposed on a side of the box away from the coil, wherein one side of the sealing membrane assembly is connected to the housing body, and another side of the sealing membrane is connected to the box.

Further, the sealing membrane assembly includes a connection element attached to an inner wall of the housing body away from the coil, and a sealing element with one side thereof connected to the connection element and another side thereof connected to the box.

Further, the magnetic circuit system further includes a yoke fixedly connected to the main magnet and the auxiliary magnet, a main pole plate attached to the main magnet, an auxiliary pole plate surrounding the main pole plate and attached to the auxiliary magnet; the yoke is arranged in the mounting groove; and two coils are oppositely arranged on both sides of the yoke.

Further, the elastic assembly includes a first elastic element and a second elastic element opposite to the first elastic element on both sides of the box. The first elastic element includes a first elastic arm connected with the housing body, a second elastic arm connected with the box, a first elastic part connecting the first elastic arm and a second elastic arm. The second elastic element includes a third elastic arm connected with the housing body, a fourth elastic arm connected with the box, and a second elastic part connecting the third elastic arm and the fourth elastic arm.

Further, the vibration system includes an upper diaphragm connected to the frame, a lower diaphragm arranged opposite to the upper diaphragm along the first direction, a skeleton arranged between the upper diaphragm and the lower diaphragm, a dome arranged between the skeleton and the upper diaphragm, a flexible circuit board connected with the lower diaphragm, a voice coil inserted in the magnetic gap and connected with the skeleton; an outer edge of the upper diaphragm is connected to the frame and an inner edge of the upper diaphragm is connected to the dome; the outer edge of the lower diaphragm is connected to the flexible circuit board and the inner edge of the lower diaphragm is connected to the skeleton.

Further, the box includes a hole opened in one side of the box, one end of the flexible circuit board is connected to the lower diaphragm, and the other end engages with the hole.

The sounding device further includes an air-permeable film between the coil and the magnetic circuit system.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

Figure 1:
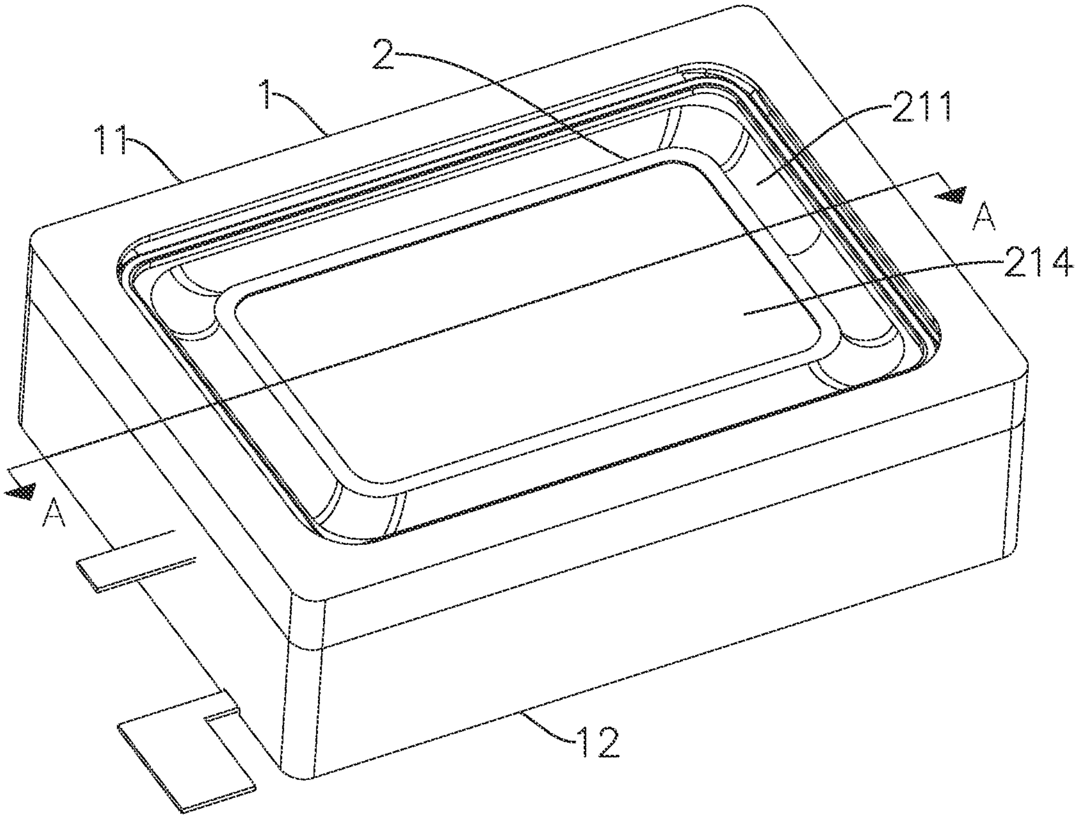
FIG. 1 is an isometric view of a sounding device provided by an embodiment of the present invention.
Figure 2:
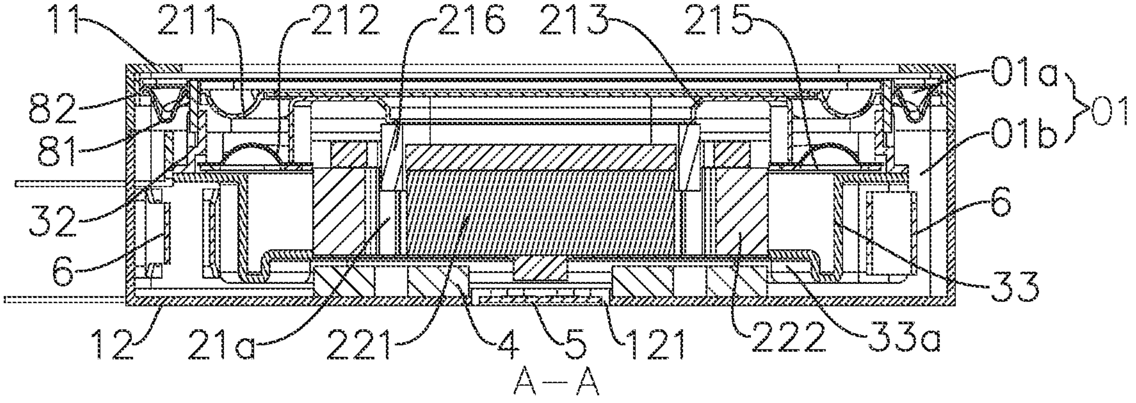
FIG. 2 is a cross-sectional view of the sounding device taken along line AA of FIG. 1.
Figure 3:
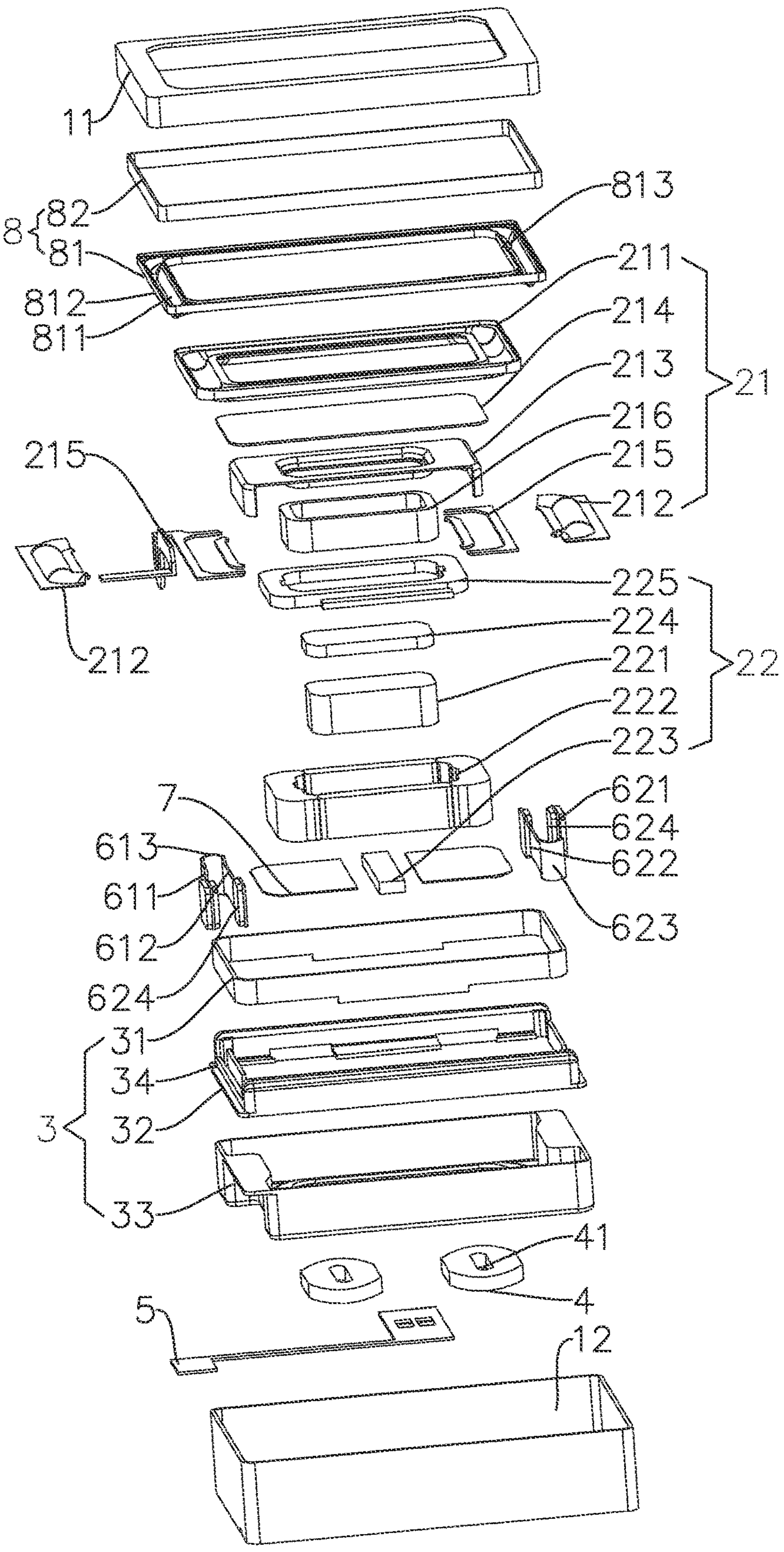
FIG. 3 is an exploded view of the sounding device.
Figure 4:
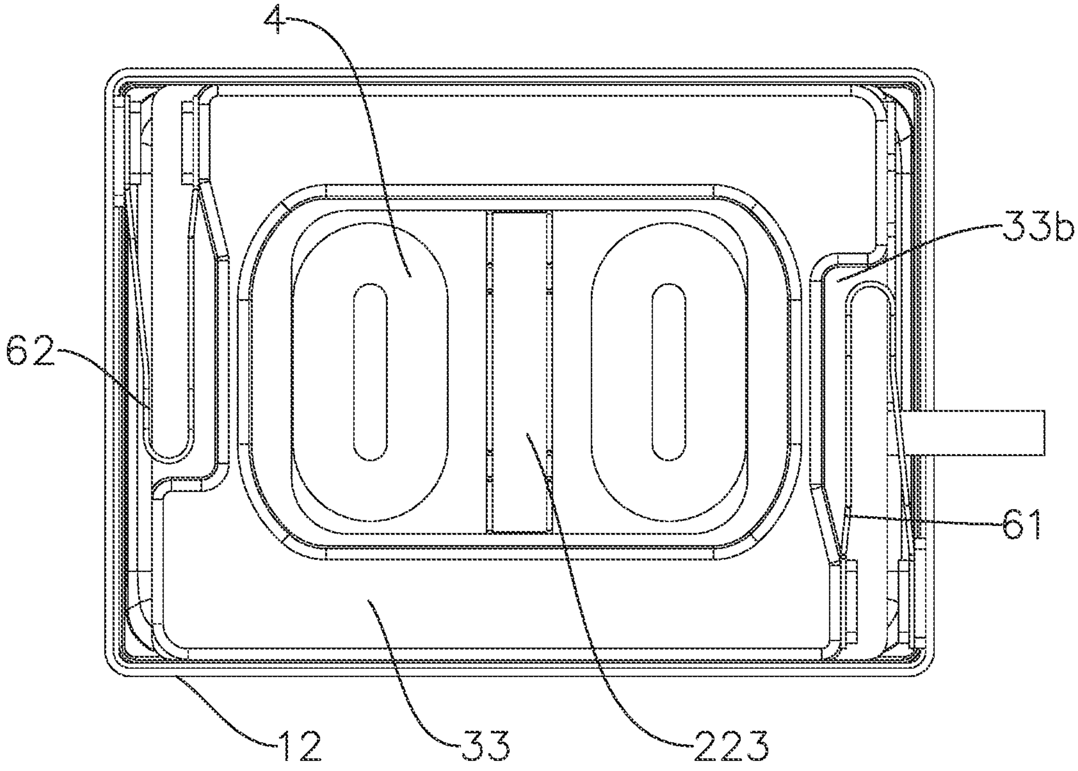
FIG. 4 is a bottom view of the sounding device with a lower housing body thereof removed.
Figure 5:
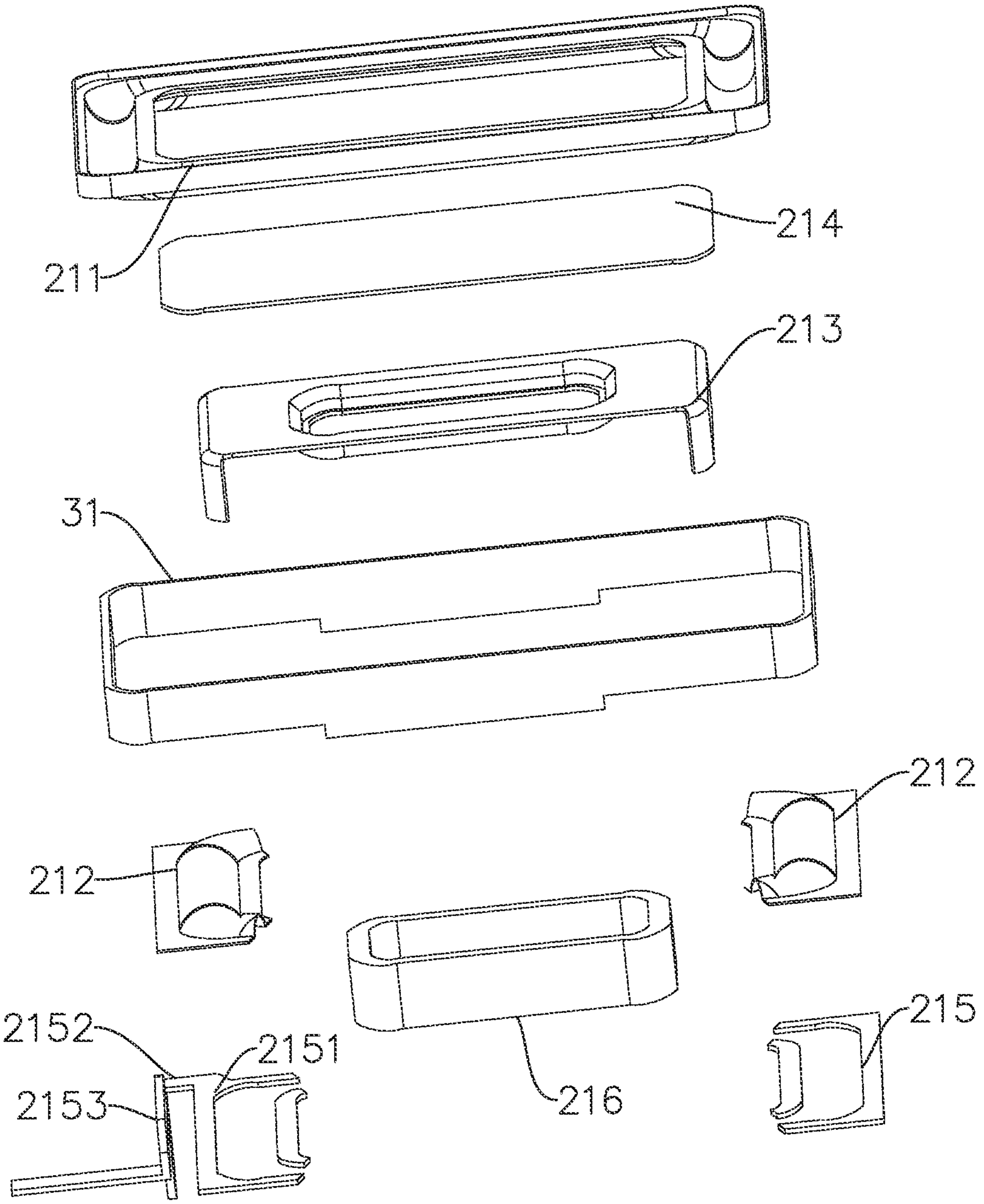
FIG. 5 is an exploded view of a vibration system of the sounding device.
Figure 6:
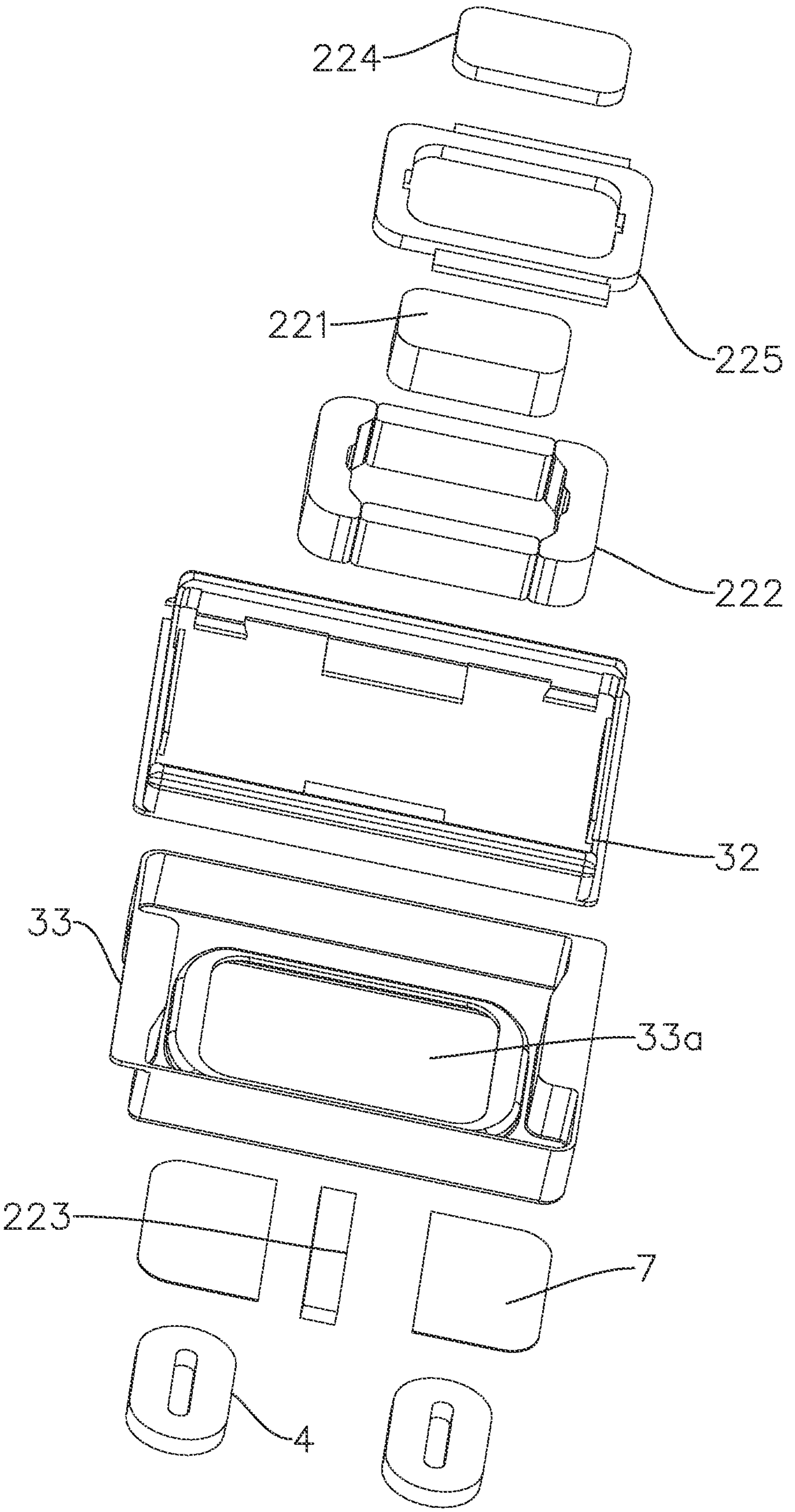
FIG. 6 is an exploded view of a magnetic circuit system and a box of the sounding device.

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

The present invention provides a sounding device, which can be used in electronic equipment, and can play a feedback prompting function by sounding, and can also play a feedback prompting effect by vibrating. The sounding device includes a housing body 1 having a containment cavity 01 and a sounding unit 2 placed in the containment cavity 01. The sounding unit 2 includes a vibration system 21 located in the containment cavity 01 and a magnetic circuit system 22 that drives the vibration system 21 to vibrate and sound in the first direction. The magnetic circuit system 22 includes a main magnet 221 and an auxiliary magnet 222 disposed around the main magnet 221 to form a magnetic gap 21*a*. The sounding device also includes a box 3 located in the containment cavity 01, a coil 4 arranged on the side of the magnetic circuit system 22 away from the vibration system 21 and arranged at an interval from the magnetic circuit system 22, a circuit board 5 arranged on the side of the housing body 1 facing the coil 4 and is electrically connected to the coil 4, an elastic assembly 6 with one end connected to the housing body 1 and the other end connected to the box 3. The vibration system 21 and the magnetic circuit system 22 are arranged in the box 3. The coil 4 is fixed to the housing body 1 to drive the sounding unit 2 to vibrate in the second direction. The second direction is set perpendicular to the first direction. The elastic assembly 6 is used to suspend the box 3 in the containment cavity 01.

In this embodiment, the coil 4 is arranged on one side of the sounding unit 2 and the sounding unit 2 is suspended in the housing body 1 by the elastic assembly 6, and the coil 4 is arranged at an interval from the magnetic circuit system 22. The vibration system 21 vibrates under the action of the main magnet 221 and the auxiliary magnet 222 to realize the vibration of the vibration system 21, so as to realize the voice feedback prompt of the device. The vibration feedback of the device is realized by driving the sounding unit 2 to vibrate through the interaction force between the coil 4 and the main magnet 221, and the auxiliary magnet 222, so that the sounding device has the performance of speaker and motor. The coil 4 and the vibration system 21 share a magnetic circuit system 22. The parts can be shared to the greatest extent, the total number of parts can be saved, the assembly process can be simplified, and the cost can be saved. Since the coil 4 and the vibration system 21 share a magnetic circuit system 22, the sounding unit 2 is directly used as the weight unit of the coil 4. There is no need to add extra weight units, which can maximize the space while taking into account the speaker performance and motor performance.

Specifically, the housing body 1 is formed by enclosing an upper housing body 11 and a lower housing body 12. The lower housing body 12 is provided with an accommodation groove 121 matching the circuit board 5. The circuit board 5 is accommodated in the accommodation groove 121. The circuit board 5 transmits electrical energy to the coil 4 so that the coil 4 can generate a magnetic field. The coil 4 interacts with the magnetic field generated by the main magnet 221 and the auxiliary magnet 222. Thereby, the sounding unit 2 is driven to vibrate back and forth along the vibration direction in the containment cavity 01.

Further, the box 3 includes a frame 31 connected with the vibration system 21, an upper box 32 connected with the frame 31, and a lower box 33 connected to the side of the upper box 32 away from the frame 31. The elastic assembly 6 is connected to the housing body 1. The elastic assembly 6 is connected to the lower box 33. The coil 4 is provided on the side of the lower box 33 away from the upper box 32. The side of the lower box 33 away from the upper box 32 is recessed toward the upper box 32 to form a mounting groove 33*a*, and the coil 4 is at least partially located in the mounting groove 33*a*.

In this embodiment, the frame 31, the upper box 32 and the lower box 33 are sequentially connected and enclosed to form a box 3, and one side of the box 3 is open for installing the magnetic circuit system 22 and the vibration system 21. The side of the lower box 33 away from the upper box 32 is recessed to form a mounting groove 33*a* so that the coil 4 is at least partially located in the mounting groove 33*a*. The thickness of the coil 4 and the thickness of the sounding unit 2 are partially overlapped, so that the thickness of the device can be reduced, the space occupied by the coil 4 can be saved, and the development of thinning can be facilitated. At the same time, the box 3, the vibration system 21 and the magnetic circuit system 22 form a weight unit, and the entire sounding unit 2 is used as a rotor. The coil 4 acts as a stator and drives the sounding unit 2 to vibrate through the interaction force between the coil 4 and the main magnet 221, and the auxiliary magnet 222 to realize the vibration feedback of the device.

Further, two coils 4 are arranged. The magnetic circuit system 22 also includes a yoke 223 for fixedly connecting the main magnet 221 and the auxiliary magnet 222, a main pole plate 224 attached to the main magnet 221, an auxiliary pole plate 225 surrounding main pole plate 224 and attached to the auxiliary magnet 222. The yoke 223 is set in the mounting groove 33*a*. The two coils 4 are arranged opposite on two sides of the yoke 223. A air-permeable film 7 disposed between the coil 4 and the magnetic circuit system 22 is also included.

In this embodiment, the polarity of the end of the main magnet 221 facing the coil 4 is opposite to the polarity of the end of the auxiliary magnet 222 facing the coil 4, so that the coil 4 can vibrate. The coil 4 is provided with a wire winding hole 41. In the first direction, the wire winding hole 41 is disposed opposite to the magnetic gap 21*a*, and the relative position between the coil 4 and the main magnet 221, and the auxiliary magnet 222 is optimized. In order to increase the relative force between the coil 4 and the main magnet 221, and the auxiliary magnet 222, the driving of the sounding unit 2 is guaranteed. In this embodiment, two coils 4 are arranged, and the two coils 4 are arranged on both sides of the yoke 223. Of course, in other embodiments, by increasing the number of the coil 4 in a limited space, the relative area between the coil 4 and the main magnet 221, and the relative area between the coil 4 and the auxiliary magnet 222 can be increased, thereby increasing the interaction force between the coil 4 and the main magnet 221, and the auxiliary magnet 222. The yoke 223 is located in the mounting groove 33*a*, While ensuring the avoidance of the yoke 223 to the coil 4, the thickness of the device can be reduced, in this way, the space occupied by the coil 4 is decreased, which is conducive to the development of thinning. Wherein, the air-permeable film 7 is installed in the mounting groove 33*a* to prevent impurities such as dust in the air from entering the sounding unit 2.

Further, the elastic assembly 6 includes a first elastic element 61 and a second elastic element 62. The first elastic element 61 and the second elastic element 62 are set on both sides of the box 3. The first elastic element 61 includes a first elastic arm 611 connected to the housing body 1, a second elastic arm 612 connected to box 3, and a first elastic part 613 connecting the first elastic arm 611 and the second elastic arm 612. The second elastic element 62 includes a third elastic arm 621 connected to the housing body 1, a fourth elastic arm 622 connected to the box 3, and a second elastic part 623 connected to the third elastic arm 621 and the fourth elastic arm 622.

In this embodiment, the first elastic element 61 and the second elastic element 62 are both V-shaped. The first elastic arm 611 and the third elastic arm 621 are respectively fixedly connected with opposite sides of the housing body 1. The second elastic arm 612 and the fourth elastic arm 622 are respectively fixedly connected with opposite sides of the box 3 to stably suspend the sounding unit 2 in the containment cavity 01.

During the vibration of the sounding unit 2, the first elastic arm 611 and the second elastic arm 612 move closer to each other and move away from each other through the first elastic part 613. third elastic arm 621 and the fourth elastic arm 622 move closer to each other and move away from each other through the second elastic part 623.

It can be understood that in other embodiments, the first elastic element 61 and the second elastic element 62 may also be U-shaped, and the two ends of the first elastic element 61 and the second elastic element 62 are connected to the housing body 1 and the box 3 respectively. In some other embodiments, the opposite surfaces of the first elastic arm 611 and the second elastic arm 612 are both provided with a first gasket 614. The opposite surfaces of the third elastic arm 621 and the fourth elastic arm 622 are provided with a second gasket 624. The first gasket 614 and the second gasket 624 are made of elastic materials such as foam, rubber, and silicone to cushion the collision when the first elastic element 61 and the second elastic element 62 are deformed.

Further, the vibration system 21 includes an upper diaphragm 211 connected to the frame 31, a lower diaphragm 212 arranged opposite to the upper diaphragm 211 along the first direction, a skeleton 213 placed between the upper diaphragm 211 and the lower diaphragm 212, a dome 214 placed between the skeleton 213 and the upper diaphragm 211, a flexible circuit board 215 connected to the lower diaphragm 212, a voice coil 216 inserted in the magnetic gap 21*a* and connected to the skeleton 213. The outer edge of the upper diaphragm 211 is connected to the frame 31 and the inner edge of the upper diaphragm 211 is connected to the dome 214. The outer edge of the lower diaphragm 212 is connected to the flexible circuit board 215 and the inner edge of the lower diaphragm 212 is connected to the skeleton 213. A hole 34 is opened on one side of the box 3, one end of the flexible circuit board 215 is connected to the lower diaphragm 212, and the other end protrudes from the hole 34 to be fixed on the box 3.

In this embodiment, in the process of sounding, the voice coil 216 drives the upper diaphragm 211 and the lower diaphragm 212 to vibrate under the combined action of the changing current and the magnetic circuit system 22. Thereby, the air near the upper diaphragm 211 and the lower diaphragm 212 vibrates to generate sound. During the vibration of the upper diaphragm 211 and the lower diaphragm 212, the synergistic effect of the skeleton 213 and the dome 214 enhances the strength of the entire dome 214 of the speaker, achieving the suppression of the segmentation vibration generated on the dome 214 of the speaker. The acoustic performance of the speaker is improved, the overall sound quality of the speaker is improved, and the resonance frequency of the dome 214 of the speaker is lowered.

It should be noted that one of the flexible circuit boards 215 includes a first branch part 2151 connected to the lower diaphragm 212, an extension part 2153 attached to the outer wall of box 3, a second branch part 2152 connecting the first branch part 2151 and the extension part 2153. The second branch part 2152 is formed by extending outward from the side of the first branch part 2151 away from the lower diaphragm 212, and the second branch part 2152 passes through the hole 34 to the outer wall of the box 3. The extension part 2153 is formed by extending from the side of the second branch part 2152 away from the first branch part 2151, and the extension part 2153 is attached to the outer wall of the box 3. The space occupied by the flexible circuit board 215 can be saved.

Further, it also includes a sealing membrane assembly 8 disposed on the side of the box 3 away from the coil 4, one side of the sealing membrane assembly 8 is connected to the housing body 1 and the other side is connected to the box 3. The sealing membrane assembly 8 includes a sealing element 81 and a connection element 82. The connection element 82 is attached to the inner wall of the housing body 1 on the side away from the coil 4. The sealing element 81 is connected to the connection element 82. The other side of the sealing element 81 is connected to the box 3.

In this embodiment, a matching sunken groove 33*b* is formed on the side of the lower box 33 near the coil 4. The shape of the matching sunken groove 33*b* matches the first elastic element 61 and the second elastic element 62. It is used to accommodate the first elastic element 61 and the second elastic element 62 and reduce the thickness of the device. The space occupied by the first elastic element 61 and the second elastic element 62 can be saved, which is beneficial to the development of thinning. One side of the sealing element 81 is hermetically connected to the housing body 1 and the other side of the sealing element 81 is hermetically connected to the box 3, so as to achieve the sealing and waterproofing requirements between the sounding unit 2 and the housing body 1.

Meanwhile, in the first direction, the containment cavity 01 is separated into a front cavity 01*a* and a back cavity 01*b* by the sealing element 81. Specifically, a bending part 811 is formed by the recessed sealing element 8. When the coil 4 drives the sounding unit 2 to vibrate, the sealing element 81 is more likely to be deformed by being pushed and pulled by the sounding unit 2, so that the sounding unit 2 is more likely to vibrate. In some other embodiments, the sealing element 81 also includes a first connection part 812 extending from the inner edge of the bending part 811 and fixed with the box 3 in the sounding unit 2, a second connecting part 813 extending from the outer edge of the bending part 811 and fixed with the connection element 82. The connection element 82 is set on the inner wall of the housing body 1. The sealing element 81 and the sounding unit 2 is realized through the first connection part 812, and the sealed connection between the sealing element 81 and the housing body 1 is realized through the second connection part 813.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sounding device, including: a housing body with a containment cavity; a sound generator placed in the containment cavity, including a vibration system located in the containment cavity, a magnetic circuit system for driving the vibration system to vibrate along a first direction; a box located in the containment cavity for accommodating the magnetic circuit system and the vibration system; a coil arranged on a side of the magnetic circuit system away from the vibration system and keeping a distance from the magnetic circuit system; a circuit board locating on a side of the housing body facing the coil and electrically connected to the coil; an elastic assembly with one end connected to the housing body and the other end connected to the box for elastically suspending the box in the containment cavity; wherein the magnetic circuit system includes a main magnet and an auxiliary magnet around the main magnet for forming a magnetic gap; and the coil is fixed to the housing body for driving the sound generator for vibrating in a second direction perpendicular to the first direction; wherein the box includes a frame connected to the vibration system, an upper box connected to the frame, and a lower box connected to a side of the upper box away from the frame: one end of the elastic assembly is connected to the housing body, and the other end of the elastic assembly is connected to the lower box; the coil is located on a side of the lower box away from the upper box.

2. The sounding device as described in claim 1, wherein a side of the lower box away from the upper box is recessed toward the upper box for forming a mounting groove for at least partially receiving the coil.

3. The sounding device as described in claim 1, further including a sealing membrane assembly disposed on a side of the box away from the coil, wherein one side of the sealing membrane assembly is connected to the housing body, and another side of the sealing membrane is connected to the box.

4. The sounding device as described in claim 3, wherein the sealing membrane assembly includes a connection element attached to an inner wall of the housing body away from the coil, and a sealing element with one side thereof connected to the connection element and another side thereof connected to the box.

5. The sounding device as described in claim 2, wherein the magnetic circuit system further includes a yoke fixedly connected to the main magnet and the auxiliary magnet, a main pole plate attached to the main magnet, an auxiliary pole plate surrounding the main pole plate and attached to the auxiliary magnet; the yoke is arranged in the mounting groove; and two coils are oppositely arranged on both sides of the yoke.

6. The sounding device as described in claim 1, wherein the elastic assembly includes a first elastic element and a second elastic element opposite to the first elastic element on both sides of the box;

the first elastic element includes a first elastic arm connected with the housing body, a second elastic arm connected with the box, a first elastic part connecting the first elastic arm and a second elastic arm; and the second elastic element includes a third elastic arm connected with the housing body, a fourth elastic arm connected with the box, and a second elastic part connecting the third elastic arm and the fourth elastic arm.

7. The sounding device as described in claim 1, wherein the vibration system includes an upper diaphragm connected to the frame, a lower diaphragm arranged opposite to the upper diaphragm along the first direction, a skeleton arranged between the upper diaphragm and the lower diaphragm, a dome arranged between the skeleton and the upper diaphragm, a flexible circuit board connected with the lower diaphragm, a voice coil inserted in the magnetic gap and connected with the skeleton; an outer edge of the upper diaphragm is connected to the frame and an inner edge of the upper diaphragm is connected to the dome; the outer edge of the lower diaphragm is connected to the flexible circuit board and the inner edge of the lower diaphragm is connected to the skeleton.

8. The sounding device as described in claim 7, wherein the box includes a hole opened in one side of the box, one end of the flexible circuit board is connected to the lower diaphragm, and the other end engages with the hole.

9. The sounding device as described in claim 1, further including an air-permeable film between the coil and the magnetic circuit system.

* * * * *